POLARIZATION BEHAVIOR OF LITHIUM-SULFUR CELL.

INVENTOR.
M. L. BHASKARA RAO

United States Patent Office

3,413,154
Patented Nov. 26, 1968

3,413,154
ORGANIC ELECTROLYTE CELLS
Marur Lakshmanaroa Bhaskara Rao, Burlington, Mass., assignor to P. R. Mallory & Co., Inc., Indianapolis, Ind., a corporation of Delaware
Filed Mar. 23, 1966, Ser. No. 536,814
3 Claims. (Cl. 136—100)

ABSTRACT OF THE DISCLOSURE

This invention relates to high energy density cells. Light metals such as Li°, Ca°, Be°, Mg°, and Al directly or with surface amalgamation with mercury have been used as negative electrodes. For positive electrode a mixture of inert conductor with sulfur has been employed. Electrolytes containing cation of light metals and ammonium ions and anions of tetrafluoborate, tetra-chloroaluminate, perchlorate and chloride have been used in organic solvents. The solvents are propylene carbonate, $\gamma$-butyrolactone, N:N-dimethylformamide and dimethylsulfoxide cell voltages of 2.52 to 1.16 v. have been realized in employing these systems.

---

This invention relates to high energy density cells and, more particularly, to high energy density cells and batteries employing light metal anodes and sulfur cathodes in organic electrolyte media.

The energy derived from any cell system may be described in terms of gravimetric and volumetric energy density; to wit: watt-hours/lb. and watt-hours/in.$^3$, respectively. Low equivalent weight of active materials and high electrochemical potential difference between anode and cathode contribute to high gravimetric energy density. Cells comprising high density atcive materials, with low esuivalent weight and high electrochemical potential between anode and cathode, possess high volumetric energy density. It can be demonstrated by theoretical calculations that high gravimetric and columetric energy density cells may be made by employing light metal anodes and sulfur cathodes. The following table gives the theoretical energy densities of some light metal anode-sulfur cathode cells.

TABLE I

| Cell reaction | Energy density | |
|---|---|---|
| | Watt-hrs./lb. | Watt-hrs./in.$^3$ |
| $2Li+S=Li_2S$ | 1,336 | 52.9 |
| $Be+S=BeS$ | 730 | 51.5 |
| $Ca+S=CaS$ | 796 | 50.6 |
| $Mg+S=MgS$ | 790 | 54.3 |
| $2Al+3S=Al_2S_3$ | 564 | 45.7 |

The calculations resulting in the above figures are based on the book "Oxidation-Reduction Potentials" by W. M. Latimer, published by Prentice Hall, Inc.

The cells listed in Table 1 cannot be successfully operated in aqueous electrolytes because of the reactivity of light metal anodes with water. However, it has been found that the said cells become operative and practical if the aqueous electrolyte is replaced with a suitable non-aqueous, organic electrolyte. As used here, the term "organic electrolyte" refers to ionically conducting solutions of inorganic and/or organic salts in organic solvents.

It is an object of the present invention to improve primary and secondary cells and batteries.

It is another object of the present invention to provide improved primary and secondary cells having high gravimetric energy densities.

A further object of the invention is to provide novel and improved primary and secondary cells or batteries characterized by high volumetric energy densities.

It is also within contemplation of the present invention to provide suitable organic electrolytes wherein the cell electrodes are chemically and dimensionally stable in the absence of any gas evolution.

The invention also contemplates an organic electrolyte cell or battery which is simple in construction, is reliable and safe in operation and which may be readily manufactured and sold on a practical and commercial scale at a low cost.

Figure 1:
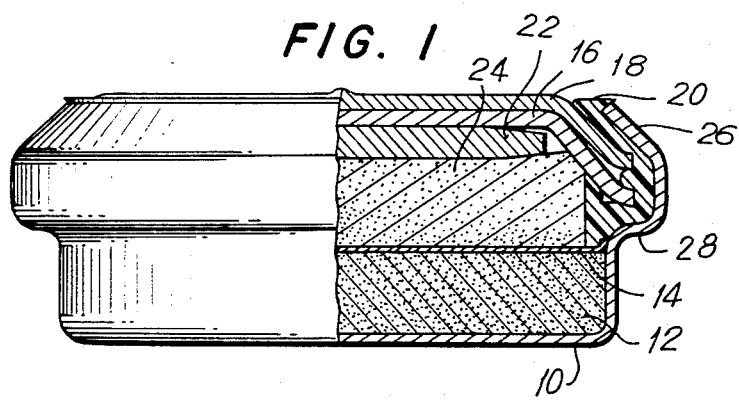
Figure 2:
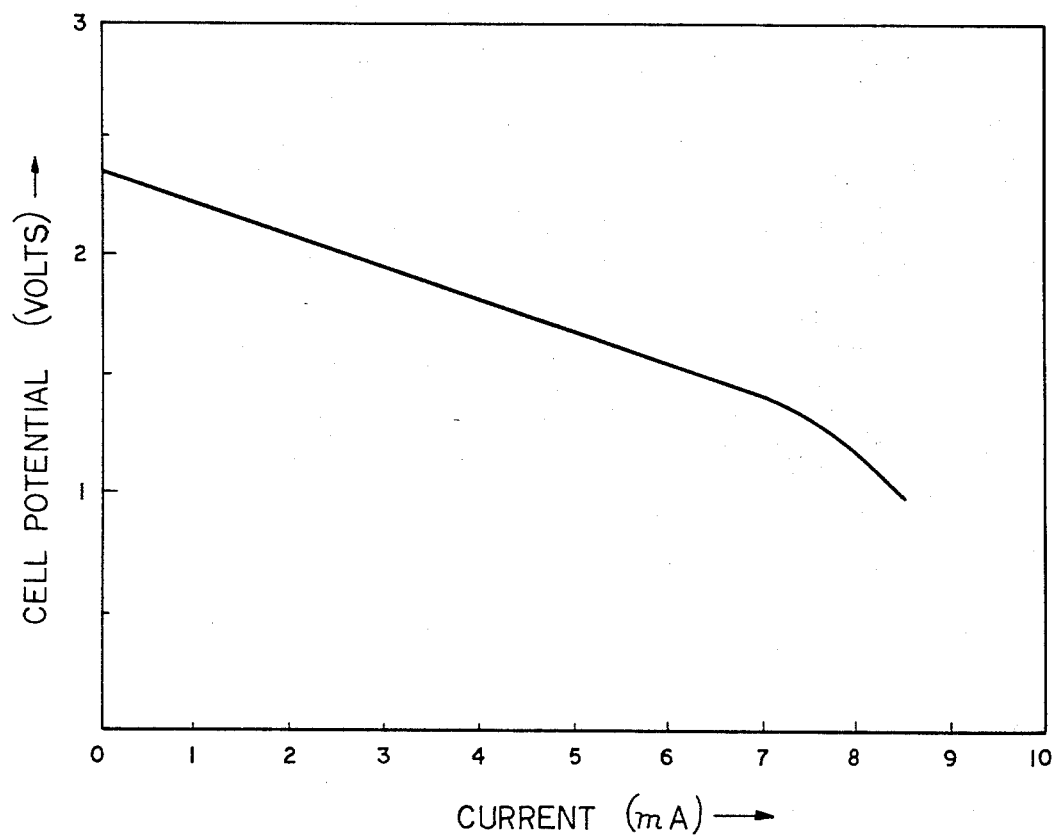

Other and further objects and advantages of the present invention will become apparent from the following description, taken in conjunction with the accompanying drawing, in which:

FIG. 1 is a vertical sectional view, having parts in elevation, embodying the invention; and FIG. 2 is a graph showing the polarization behavior of a lithium-sulfur cell of the invention.

Broadly stated, according to the principles of the present invention, there is provided an electric cell comprising a light metal anode, a sulfur cathode, and an organic electrolyte. Light metal anodes suitable for the purposes of the present invention may be composed of lithium, sodium, beryllium, calcium, magnesium, aluminum, and the like. In some cases, it is desirable to amalgamate the surface of the anode metal with mercury, as it will be set forth more fully hereinafter. The cathodes used in the present invention are made by mixing powdered sulfur with finely divided carbon or graphite, or with some other inert material of higher conductivity and then pressing the mixture into suitable containers. The proportion of inert material, such as carbon black, in the mix may be between 5% and 25% by weight, preferably, 20% by weight.

Suitable electrolytes may be made by dissolving salts comprising light metal or ammonium cations and tetrafluoborate, tetrachloroaluminate, perchlorate or chloride anions in certain organic solvents, such as in propylene carbonate, gamma butyrolacetone, dimethyl formamide and dimethyl sulfoxide in 1 molar concentration. The above-mentioned organic solvents may be used individually or in admixture with each other, or with other solvents, such as ethylene carbonate, acetonitrile and methyl or butyl formate.

Referring now more particularly to FIG. 1 of the drawing, the structure used and the procedure followed in assembling a practical cell embodying the invention will be described. Reference numeral 10 denotes a cathode container made of stainless steel in which there is compressed a body of cathode mix 12. The cathode mix consists of a 1:3:1 by weight mixture of carbon black, powdered sulfur and lithium perchlorate, respectively. 0.3 grams of the mix are pressed into the cathode container at a pressure of 7000 lbs./in.$^2$. A thin barrier or separator layer 14 of microporous inert material, such as fiberglass or nylon, is placed in the cathode containe on top of the compressed cathode mix.

The top closure of the cell comprises inner top disc 16 made of stainless steel and outer top disc 18 likewise made of stainless steel, the said two top discs having their center portions nested in and their edge portions slightly separated from each other. An insulating and sealing grommet 20 made of a suitable elastomer, such as neoprene or polyethylene, is stretched or molded around the circumferential edges of top discs 16 and 18. A detailed description of the assembly and operation of this so-called "double" top structure will be found in Williams patent 2,712,565 and Clune patent 3,096,217, to which reference is hereby made.

In inner top disc 16 there is anode 22 cut from a plate of the anode metal, for example lithium, to fit the inner dimensions of the said disc. A body of an electrolyte absorbent 24, such as cotton, is interposed between anode 22 and cathode .0.5 cc. for the electrolyte, such as 1 M lithium perchlorate dissolved in propylene carbonate, is impregnated in the absorbent. Thereupon, the cell is assembled and is permanently sealed by crimping down enlarged mouth portions 26 of cathode container 10 over grommet 20 which is thus strongly compressed between the said mouth portions and the annular shoulder 28 of the said container. Any excess electrolyte present is squeezed out during the final assembly of the cell. Also, some of the lithium perchlorate present in the cathode is dissolved by the electrolyte impregnating the same, which increases the porosity and the efficiency of the cathode.

Table II gives the open circuit potentials of typical cells embodying the invention and using an electrolyte of 1 molar lithium perchlorate in propylene carbonate.

TABLE II

| Cell | Open circuit voltage | |
|---|---|---|
| | Calculated | Observed |
| Li-S | 2.52 | 2.35–2.5 |
| Be-S | 1.208 | 1.15–1.20 |
| Na-S | 2.50 | 2.45–2.5 |
| Mg-S | 1.83 | 1.65–1.70 |
| Al-S | 1.16 | 1.00 |

As it will be noted from the foregoing table, the observed open circuit potentials of the cells examplified are close to the expected values.

The operating characteristics of a typical cell embodying the invention are exemplified by the curve shown in FIG. 2. As it appears from this figure, the operating characteristics are reasonable for the particular cell configuration. Excursions on the current-potential curves indicated reversibility of the cell reactions. From the slope of the curve in FIG. 2, the internal resistance of the cell was calculated and it was found that the magnitude of IR is of the expected order for the particular electrolyte used. It was also observed that the lithium-sulfur system is rechargeable.

The example described in the foregoing evidences practicality of the present invention which may be extended to making similar cells comprising other alkali metals, such as calcium, with or without amalgamation. Operation of the cell may be improved by increasing conductivity of the cathode mix. This can be accomplished by using thin layers and/or by incorporating powder of an inert metal, such as tantalum, stainless steel, or copper. To improve structural integrity, the techniques of applying the cathode mix may be changed to higher consolidating pressures, depositing the sulfur from its solutions, incorporating suitable binders, for example ethyl cellulose, or by a combination of these expedients. Porous cathodes may be prepared by incorporating electrolyte salt or other materials in suitable proportions so that the said material, when dissolved in the solvent, leaves the electrode porous. Metal foils, screens or grids may be incorporated with the cathode in order to provide low resistance electrical contact therewith. Similar expedients can be used in the anode which may be in the form of pressed powder pellets or obtained by rolling or pressing powder metal on suitable supporting metal foils or grids. The present invention also contemplates mixtures of the organic solvents disclosed in the foregoing in order to improve electrical conductivity and viscosity of the solutions.

In many cases, the performance of the light metal anodes of the cells of the invention can be considerably improved by amalgamation, in other words, by surface alloying these metals with mercury by chemical displacement of the latter from a non-aqueous solution of mercuric salt. The improvement is particularly striking with anodes formed of aluminum, magnesium, or their alloys. Amalgamation was successfully carried out by bringing the anode metal into contact with mercuric chloride solution in N-N-dimethyl formamide, gamma-butyrolactone, acetone, or in other suitable organic solvents. Instead of mercuric chloride, mercuric nitrate, mercuric acetate, mercurous chloride, mercuric bromide, and mercuric thiocyanate can be used. Generally speaking, the principles of selection of a suitable system (solute and solvent) for amalgamation are the following:

(a) The mercury salt should be soluble in the solvent.
(b) The anion of mercury salt should form corresponding salts with the anode metal, such as aluminum and magnesium, that are also soluble in the solvent employed to dissolve the mercury salt.
(c) The solvent should be stable in the presence of the anode metal and its amalgam, more particularly, it should not decompose evolving hydrogen, as is the case with acetic acid.

The principal advantages of amalgamation are that it reduces local action on the anode surface and thus provides consistent and reproducible results. Specifically with aluminum and magnesium anodes, it assures practical elimination of the usual time lag, by reducing the time lag or delay time to less than $10^{-3}$ sec.

I am aware of the fact that it has been already suggested to provide an electric cell comprising a negative electrode, a positive electrode selected from a group including 17 different elements and compounds, among them sulfur, and an organic electrolyte in which the solvent was one of the aliphatic primary, secondary and tertiary amines. (Herbert et al. Patent 3,043,896.) The solvents provided by the present invention do not belong to the class of aliphatic amines and so far have not been used to operate light metal anodes and sulfur cathodes in primary and secondary cells.

The electrolytes contemplated by the present invention consist of one or more of the solvents propylene carbonate, gamma-butyrolactone, dimethyl formamide and dimethyl sulfoxide, in which alkali metal or ammonium cation and tetrafluoborate, tetrachloroaluminate, perchlorate or chloride anion bearing salts are dissolved. It is of interest to point out the essential differences and important advantages of the light metal-sulfur cells of the present invention over systems employing aliphatic amines as solvents:

(i) The alkali amines disclosed in the Herbert et al. patent are highly basic and are organic derivatives of ammonia. The solvents used in the cells of the present invention, such as propylene carbonate, gamma-butyrolactone and dimethyl formamide, do not belong to this category and, hence, do not possess the basicity of amines.

(ii) Similarities in properties of amines to liquid ammonia reflect themselves in terms of the solubilizing power of amines and thus affect the active material stability. For example, it is known that alkali metals are soluble in some amines. Sulfur complexes with amine and dissolves as in ammonia. The consequences of dissolution of active materials of the cell in the electrolyte results in loss of capacity on standing and may adversely affect cycle life. The solvents used in the cell of the invention are inert and do not exhibit solubilization of the active materials.

(iii) Because of their basicity, amines are highly corrosive in presence of trace moisture and hence adversely affect cell components. No such corrosive properties are associated with electrolytes of the present invention.

Although the present invention has been disclosed in connection with preferred embodiments thereof, variations and modifications may be resorted to by those skilled in the art without departing from the principles of the invention. All of these variations and modifications are considered to be within the true spirit and scope of the present invention, as disclosed in the foregoing description and defined by the appended claims.

What is claimed is:

1. An electric cell comprising a light metal anode, a cathode of which the active material is sulfur, and an electrolyte composed of an organic solvent in which there is dissolved a salt having a cation selected from the group consisting of light metals and ammonium and an anion selected from the group consisting of tetrafluoroborate, tetrachloroaluminate, perchlorate and chloride, said organic solvent contained in the electrolyte being at least one compound selected from the group consisting of propylene carbonate, gamma-butyrolactone, dimethyl formamide and dimethyl sulfoxide.

2. An electric cell as specified in claim 1 in which the organic solvent further contains at least one of the compounds selected from the group consisting of ethylene carbonate acetonitrile methyl formate and butyl formate.

3. An electric cell as specified in claim 1 in which the light metal anode has been surface alloyed with mercury by chemical displacement of the mercury from non-aqueous solution of mercuric salt, said non-aqueous solution having a compatible organic solvent selected from the group consisting of N-N dimethyl formamide, gamma-butyrolactone and acetone.

References Cited

UNITED STATES PATENTS

| | | | |
|---|---|---|---|
| 3,043,896 | 7/1962 | Herbert et al. | 136—6 |
| 3,185,590 | 5/1965 | Mayer et al. | 136—6 |
| 3,248,265 | 4/1966 | Herbert | 136—100 |
| 3,279,952 | 10/1966 | Minnick | 136—83 |

WINSTON A. DOUGLAS, *Primary Examiner.*

C. F. LE FEVOUR, *Assistant Examiner.*